US010673642B2

(12) United States Patent
Loa et al.

(10) Patent No.: US 10,673,642 B2
(45) Date of Patent: Jun. 2, 2020

(54) INTEGRATING REAL-TIME PERSONALIZED DOCUMENTS INTO A VIDEO CONFERENCE SESSION

(71) Applicant: INTUIT INC., Mountain View, CA (US)

(72) Inventors: Alexander Loa, San Diego, CA (US); Jeffrey Mears, San Diego, CA (US); Kenichi Mori, San Diego, CA (US); Sybil Mulokwa, Plano, TX (US)

(73) Assignee: INTUIT, INC., Mountain View, CA (US)

( * ) Notice: Subject to any disclaimer, the term of this patent is extended or adjusted under 35 U.S.C. 154(b) by 254 days.

(21) Appl. No.: 15/667,108

(22) Filed: Aug. 2, 2017

(65) Prior Publication Data

US 2019/0044743 A1    Feb. 7, 2019

(51) Int. Cl.
*G06F 15/16*   (2006.01)
*H04L 12/18*   (2006.01)
*H04N 7/15*    (2006.01)
*G06Q 40/00*   (2012.01)
*H04N 7/14*    (2006.01)

(52) U.S. Cl.
CPC ....... *H04L 12/1818* (2013.01); *G06Q 40/123* (2013.12); *H04L 12/1822* (2013.01); *H04L 12/1831* (2013.01); *H04N 7/147* (2013.01); *H04N 7/15* (2013.01)

(58) Field of Classification Search
CPC ............ H04L 12/1818; H04L 12/1831; G06Q 40/123; H04N 7/147; H04N 7/15
USPC ....................................................... 709/204
See application file for complete search history.

(56) References Cited

U.S. PATENT DOCUMENTS 6,317,777 B1 * 11/2001 Skarbo .................... G06Q 10/10
                                                         709/204
9,578,285 B1 *  2/2017 Leske ....................... H04N 7/15
(Continued)

FOREIGN PATENT DOCUMENTS

EP      0898424 A2     2/1999
WO      0065833 A1    11/2000

OTHER PUBLICATIONS

Globalscape, "Internal Settings of Mail Express Server," Aug. 9, 2012, <https://wcb.archive.org/web/20120809031909/https://help.globalscape.com/help/me3/configuring_the_internal_portal.htm>, 4 pages.

(Continued)

*Primary Examiner* — Wing F Chan
*Assistant Examiner* — Joseph R Maniwang
(74) *Attorney, Agent, or Firm* — Patterson + Sheridan, LLP

(57) ABSTRACT

Systems, methods, and computer readable media which perform an operation comprising establishing a video conference between a first application instance and a second application instance, and during the video conference: receiving, by an application server from the first application instance, an indication of a first data element required to prepare a tax return, storing, by a notification server, the indication of the first data element, and publishing, by a notification server, the indication of the first data element to the second application instance, wherein the second application instance is configured to output the indication of the data element for display.

20 Claims, 8 Drawing Sheets

(56) References Cited

U.S. PATENT DOCUMENTS

| | | | |
|---|---|---|---|
| 2007/0186007 A1* | 8/2007 | Field | G06Q 30/02 709/233 |
| 2011/0270922 A1 | 11/2011 | Jones et al. | |
| 2012/0022983 A1* | 1/2012 | Hughes, Jr. | G06Q 40/02 705/31 |
| 2012/0166869 A1* | 6/2012 | Young | G06F 11/008 714/15 |
| 2014/0244456 A1 | 8/2014 | Huang et al. | |
| 2014/0274317 A1* | 9/2014 | McDonald | G07F 17/3225 463/25 |
| 2016/0105442 A1* | 4/2016 | Movida | H04L 63/102 726/28 |
| 2016/0308812 A1* | 10/2016 | Johnstone | H04L 51/22 |

OTHER PUBLICATIONS

Globalscape, "Introduction to Mail ExpressÂ®," Dec. 4, 2018, <https://web.archive.org/web/20170404154329//https://help.globalscape.com/help/me3/introduction_to_mail_express.htm>, 2 pages.
PCT/US2017/045156, International Search Report dated Apr. 24, 2018, 17 pages.

\* cited by examiner

INTEGRATING REAL-TIME PERSONALIZED DOCUMENTS INTO A VIDEO CONFERENCE SESSION

BACKGROUND

Field

Embodiments of the present invention generally relate to video conferencing, and more specifically, to integrating real-time, personalized documents into a video conference session.

Description of the Related Art

Often, users engage in video conferencing sessions with professionals, such as accountants, attorneys, and financial advisors. In many cases, a professional requires additional information (such as documentation) from the users so that the professional may provide different services to the users. One object of the video conferencing session is for the professional to identify the necessary additional information. However, the video conferencing session imparts limitations on such scenarios. For example, the video conference often occupies an entire screen, making it difficult to create and share lists of necessary information. Instead, the professional often prepares such a list outside of the video conference session, and emails the list to the user after the video conference session. However, such a scenario leads to questions, missed information, and incomplete or incomprehensive lists.

SUMMARY

In one embodiment, a method comprises establishing a video conference between a first application instance and a second application instance, and during the video conference: receiving, by an application server from the first application instance, an indication of a first data element required to prepare a tax return, storing, by a notification server, the indication of the first data element, and publishing, by a notification server, the indication of the first data element to the second application instance, wherein the second application instance is configured to output the indication of the data element for display.

In another embodiment, a system comprises a processor and a memory containing a program which when executed by the processor performs an operation comprising establishing a video conference between a first application instance and a second application instance, and during the video conference: receiving, by an application server from the first application instance, an indication of a first data element required to prepare a tax return, storing, by a notification server, the indication of the first data element, and publishing, by a notification server, the indication of the first data element to the second application instance, wherein the second application instance is configured to output the indication of the data element for display.

In another embodiment, a non-transitory computer readable medium stores instructions, which, when executed by a processor, performs an operation comprising establishing a video conference between a first application instance and a second application instance, and during the video conference: receiving, by an application server from the first application instance, an indication of a first data element required to prepare a tax return, storing, by a notification server, the indication of the first data element, and publishing, by a notification server, the indication of the first data element to the second application instance, wherein the second application instance is configured to output the indication of the data element for display.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 2A-2C illustrate example graphical user interfaces for integrating real-time personalized documents into a video conference session, according to various embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments disclosed herein provide techniques to integrate real-time, personalized documents in video conferencing sessions. Generally, one or more client users may participate in a networked video conferencing session with a professional user via respective instances of a common application. During the video conference, embodiments disclosed herein provide graphical user interfaces (GUIs) that allow the professional user to generate indications of required documentation (or other data). A notification server orchestrates the receipt of the generated indications from the professional user, and the transmission of the generated indications to the client user (e.g., in real-time as they are generated by the professional user). Furthermore, embodiments disclosed herein provide GUIs to allow the client user to view the indications in real-time.

Figure 1:
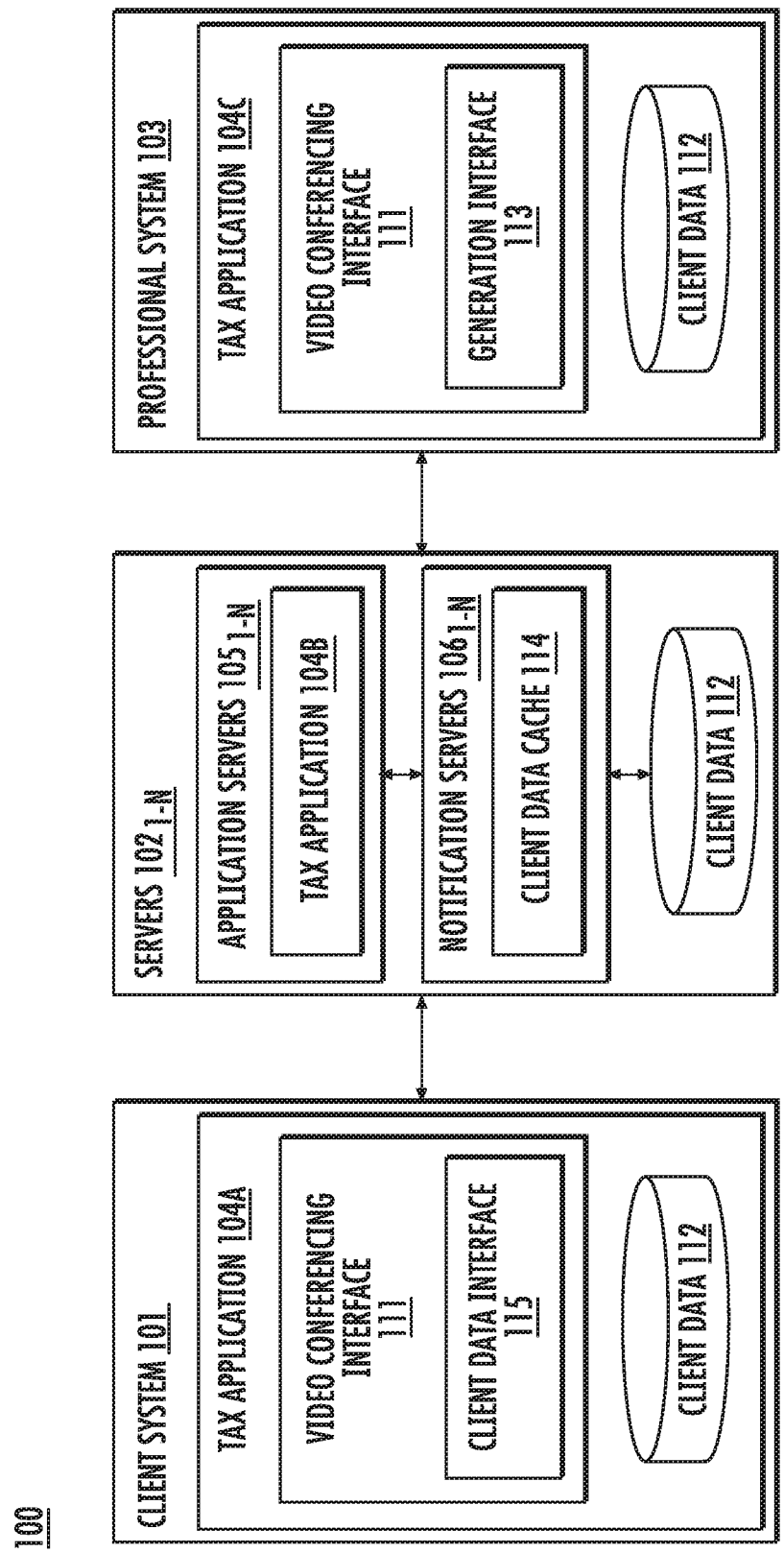
FIG. 1 illustrates an example system for integrating real-time personalized documents into a video conference session, according to one embodiment.

FIG. 1 illustrates an example system 100 for integrating real-time personalized documents into a video conference session, according to one embodiment. As shown, the system 100 includes a client system 101, one or more servers $102_{1-N}$, and a professional system 103. The client system 101 and professional system 103 are representative of any type of physical or virtual computing system, such as a laptop, desktop, tablet, and/or mobile device. As shown, the client system 101 and the professional system 103 include respective instances of a tax application 104, namely instances 104A and 104C. The tax application 104 is generally configured to facilitate preparation of a tax return for one or more users. As shown, the instances of the tax application 104A,C include a video conferencing interface 111 and data stores of client data 112. The video conferencing interface 111 allows users of the client system 101 and professional system 103 to engage in a real-time audio/video conference. For example, a user of the client system 101 may initiate a video conference with a tax professional. The user may be paired with an available tax professional, e.g., a user of the professional system 103, and a video conference is established.

During the video conference, the parties may discuss the information needed for the professional to prepare a tax return for the client. The tax professional may then identify data elements necessary to prepare the tax return, such as income statements, receipts, and the like. As shown, the instance of the tax application 104C on the professional system 103 provides a generation interface 113 that allows the professional to enter indications of the necessary data elements. Once entered by the professional, the indications may be stored in the instance of the client data 112 on the professional system 103 (and/or on the servers $102_{1-N}$). The instance of the tax application 104A on the client system 101 includes a client data interface 115 for viewing the indications of data elements entered by the tax professional.

As shown, the servers $102_{1-N}$ include a plurality of application servers $105_{1-N}$, a plurality of notification servers $106_{1-N}$, and a data store of client data 112. The servers 102, 105, and 106 are representative of physical and virtualized servers. The application servers $105_{1-N}$ execute instances of the tax application 104, namely instances 104B, which support the functionality (including video conferencing) provided by the tax application 104. The notification servers $106_{1-N}$ are generally configured to receive indications of data elements entered by the professional via the generation interface 113, and store the indications in the client data cache 114. The notification servers $106_{1-N}$ may then generate push notifications of the data elements entered by the professional, and transmit the notifications to any subscribing application server $105_{1-N}$ and/or subscribing instances of the client data interface 115.

Generally, a given instance of the tax application 104 executing on the client system 101 and/or professional system 103 establishes a socket connection with an application server $105_{1-N}$ when the respective instance of the tax application 104 is launched. For example, the instance of the tax application 104A executing on the client system 101 may establish a socket with application server $105_1$, while the instance of the tax application 104C executing on the professional system 103 may establish a socket connection with the application server $105_2$. In other embodiments, the instances of the tax application 104A,C on the systems 101, 103 may establish socket connections with the same application server $105_N$.

A user of the client system 101 may then use the video conferencing interface 111 to initiate a video conference with a professional (e.g., a user of the professional system 103). The instances of the tax application 104B on the application servers $105_{1-N}$ may then establish a connection to initiate the video conference between the client and the tax professional. Furthermore, a socket connection is established between the associated application servers $105_{1-N}$ and the notification servers $106_{1-N}$. For example, the instances of the tax application 104B and/or the respective application servers $105_{1,2}$ may each establish a socket connection with the notification server $106_1$. The client data interface 115 and/or the tax application 104A on the client system 101 may then subscribe to receive push notifications from the notification server $106_1$. In at least one embodiment, the respective instance of the tax application 104B on the application server $105_1$ subscribes to receive push notifications from the notification server $106_1$, which then pushes applicable notifications to the client data interface 115. Therefore, in one embodiment, when the tax professional enters indications of needed data elements via the generation interface 113, the generation interface 113 transmits an indication of the needed data element to the application server $105_2$. The instance of the tax application 104B executing on the application server $105_2$ then transmits an indication of the needed data element to the notification server $106_1$, which stores the indication in the client data cache 114. In another embodiment, the instance of the tax application 104C on the professional system 103 transmits the indication directly to the notification server $106_1$.

The notification server $106_1$ then generates a push notification to all subscribing client data interfaces 115. Continuing with this example, the push notification is sent from the notification server $106_1$ to the application server $105_1$, where the instance of the tax application 104B transmits the push notification to the client data interface 115 on the client system 101. The client data interface 115 then outputs an indication of the push notification to the user, and optionally stores an indication of the needed data in the client data 112.

Figure 2A:
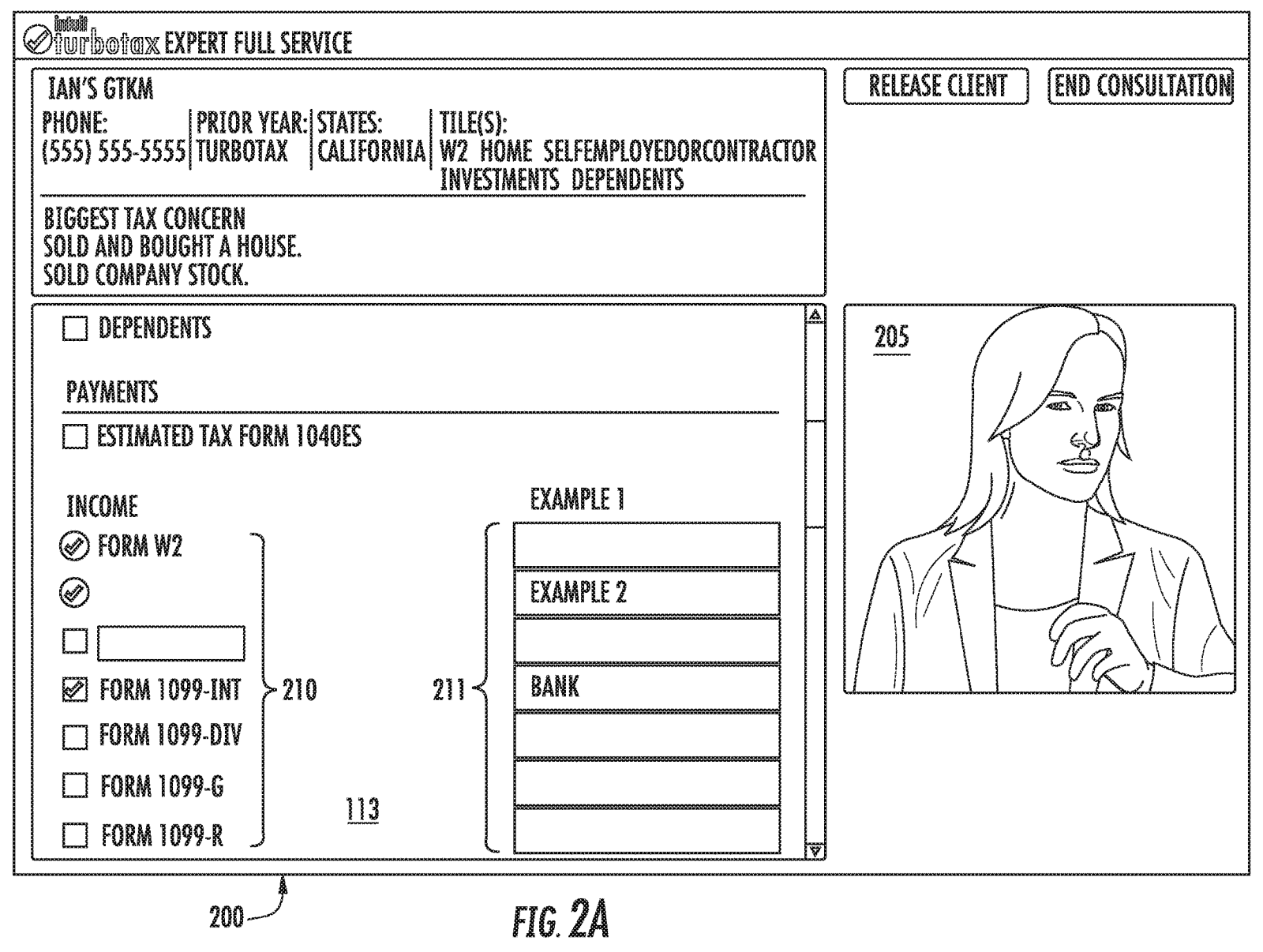

FIG. 2A illustrates an example GUI 200 used by a professional user of the professional system 103, according to one embodiment. As shown, the GUI 200 includes a video 205 and an example generation interface 113. The video 205 depicts the video data of the user of the client system 101. The generation interface 113 allows the professional user to enter indications of needed data elements. As shown, the generation interface 113 includes a plurality of fields 210 corresponding to different types of tax forms. The generation interface 113 also includes a plurality of fields 211 allowing the tax professional to enter additional information related to the corresponding type of tax form 210 (e.g., the professional may indicate a particular employer from whom a particular type of tax form is needed). Therefore, as shown, the tax professional has entered two example W2 forms and an example form 1099-INT via the generation interface 113 of the GUI 200. As the tax professional enters each entry, an indication of the entry is transmitted to the corresponding application server $105_N$, which then forwards the indication to the corresponding notification server $106_N$. The indication may include metadata describing the required data element, such as the type of data element, and a source of the data element (e.g., a W2 from employer "example1"). The indication may further include a copy of the data element, or a template thereof (e.g., a blank W2 form, a W2 form prepopulated with some information describing the user, etc.). The notification server $106_N$ may then store the indication in the client data cache 114. In some embodiments, the notification server $106_N$ stores a copy of the data element. However, if the size of the data element exceeds a threshold, the notification server $106_N$ may store a link to the data element in the cache 114, and store the actual data element at a different network location to minimize the size of the cache 114.

Figure 2B:
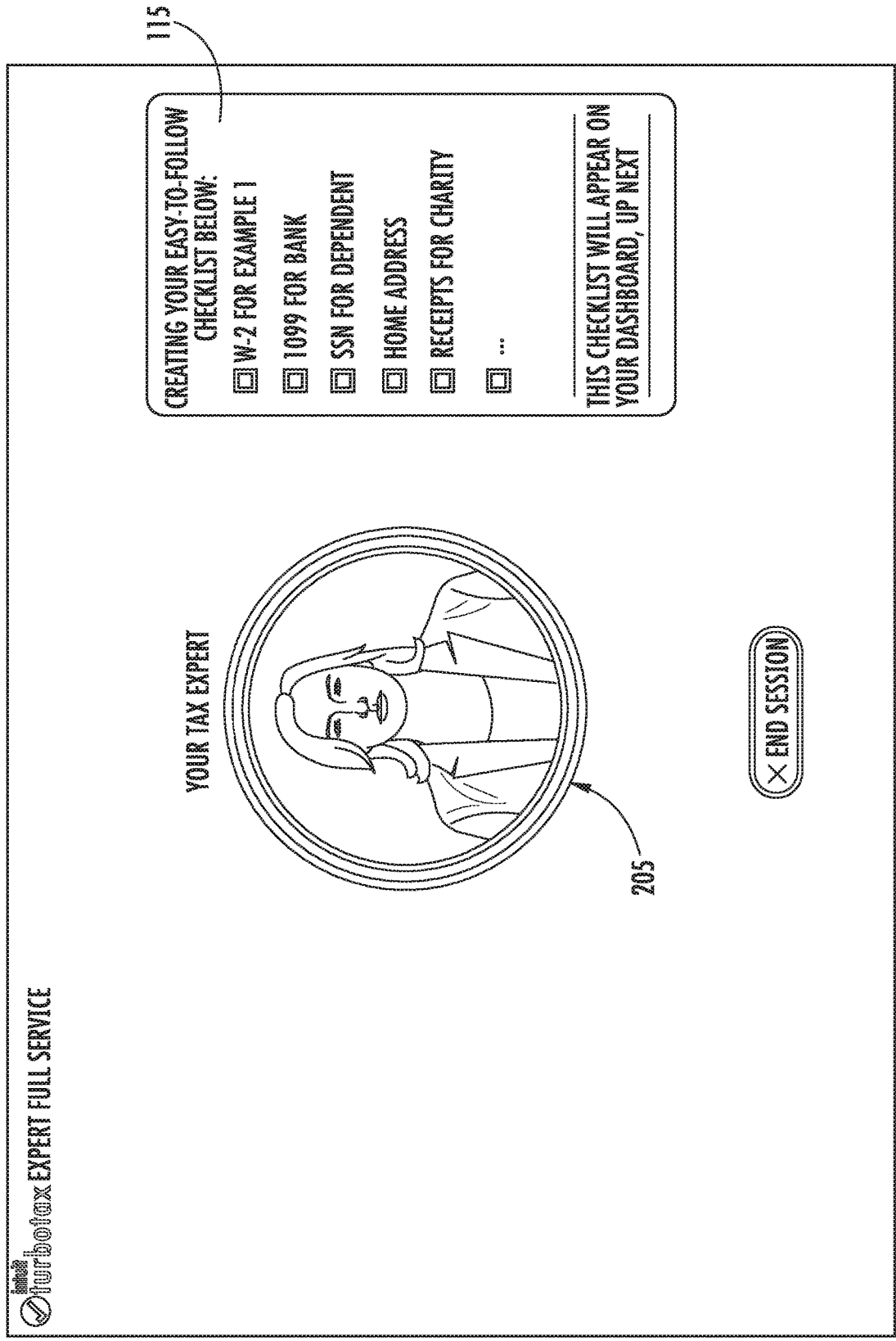

The notification server $106_N$ then generates a push notification describing the data element, which is transmitted to all subscribing client data interfaces 115. FIG. 2B illustrates an example GUI 201 which includes a video 205 and an example client data interface 115, according to one embodiment. The video 205 is the video data from the tax professional using the professional system 103 in the video conference. As shown, the client data interface 115 includes a list of data elements that correspond to the data elements entered by the tax professional via the generation interface 113. Generally, the client data interface 115 displays new data elements in real-time, as they are added by the tax professional via the generation interface 113.

Figure 2C:
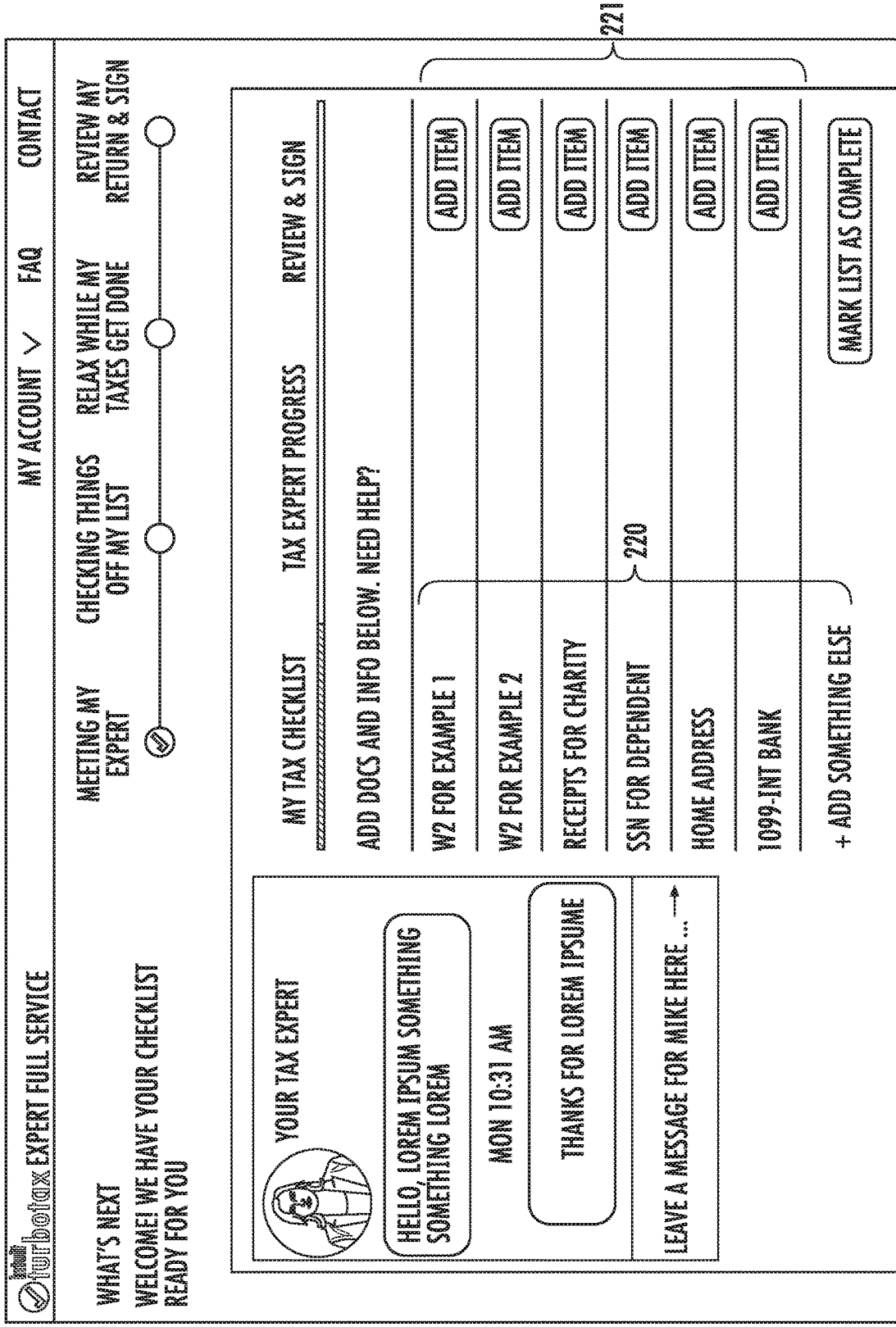

FIG. 2C depicts a GUI 202 which includes a list 220 of data elements, according to one embodiment. In at least one embodiment, the GUI 202 is accessible to the user of the client device 101 outside of a video conferencing session (e.g., after a tax consultation via video conferencing has completed). As shown, the list 220 includes example data elements (e.g., tax forms, address information, user metadata) that the tax professional entered via the generation interface 113. As shown, the GUI 202 further includes elements 221 that allow the user to enter the corresponding information. For example, the user may upload a W2 document, enter address information, and the like, via the GUI elements 221. Once the user provides the necessary information, the information is stored in the client data 112 (e.g., on one or more of the client device 101, the servers $102_{1-N}$, and/or the professional device 103). Furthermore, the user provides the necessary information, the GUIs 200-202 may be updated to reflect the user submission. For example, the professional may use the GUI 200 to view the information (e.g., forms, metadata, etc.) submitted by the user. In at least one embodiment, as the user provides the information, the application server $105_N$ and/or the notification server $106_N$ generates and sends a notification to the professional. For example, if a user uploads their W2 document, the application server $105_N$ and/or notification server $106_N$ may generate and send an email to the associated tax professional.

Figure 3:
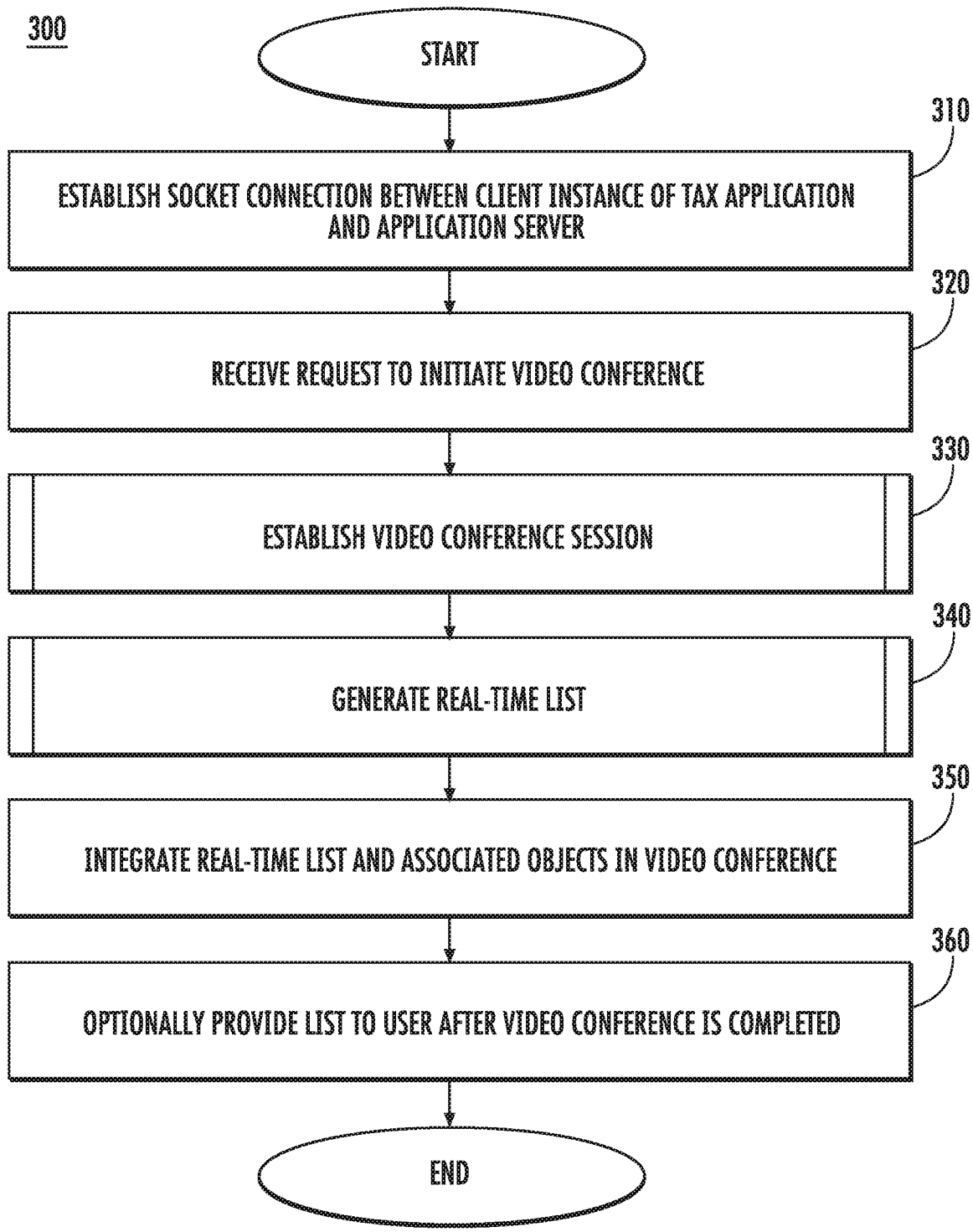
FIG. 3 is a flow chart illustrating a method to integrate real-time personalized documents into a video conference session, according to one embodiment.

FIG. 3 is a flow chart illustrating a method 300 to integrate real-time personalized documents into a video conference session, according to one embodiment. As shown, the method 300 begins at block 310, where an instance of the tax application 104A executing on the client device 101 establishes a socket connection with an application server $105_{1-N}$. At block 320, the connected application server $105_{1-N}$ receives a request from the instance of the tax application 104A executing on the client device 101 to initiate a video conference with a tax professional. At block 330, described in greater detail with reference to FIG. 4, a video conference session is established between the requesting user and a tax professional. At block 340, described in greater detail with reference to FIG. 5, the tax professional generates a real-time list during the video conferencing session. The real-time list includes one or more required data elements necessary to allow the tax professional to prepare the requesting user's taxes. At block 350, the real-time list and associated objects are integrated into the video conference. For example, as the tax professional enters indications of the data elements via the GUI 200, the user of the client device 101 may view the indications of the data elements in real-time via the GUI 201. At block 360, the tax application 104A may optionally provide the list generated at block 350 to the user (e.g., via email and/or the GUI 202) after the video conference is completed.

Figure 4:
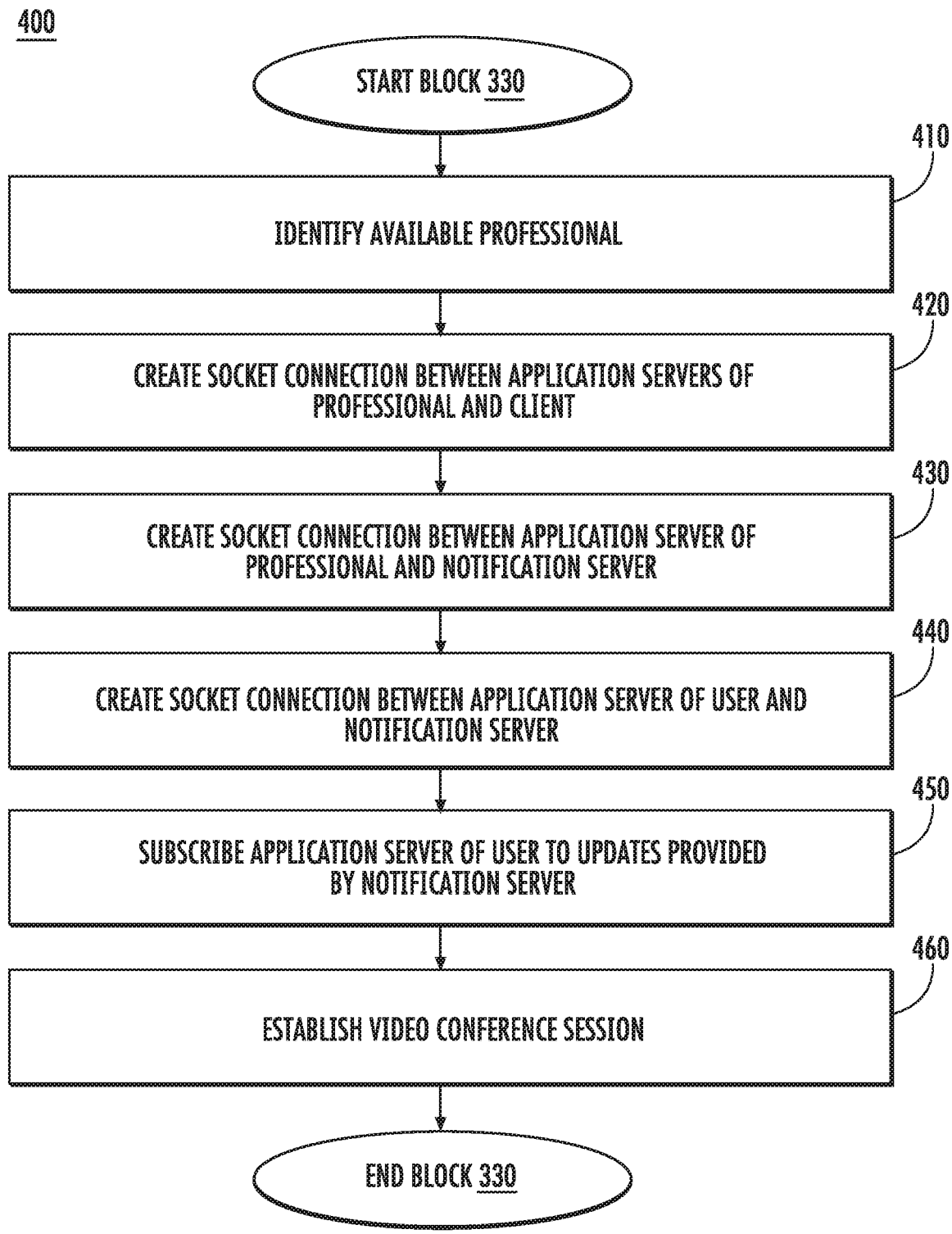
FIG. 4 is a flow chart illustrating a method to establish a video conference session, according to one embodiment.

FIG. 4 is a flow chart illustrating a method 400 corresponding to block 330 to establish a video conference session, according to one embodiment. As shown, the method 400 begins at block 410, where an available tax professional is identified. Generally, the instances of the tax application 104B on the application servers $105_{1-N}$ maintain indications of tax professionals available for video conferences. The instances of the tax application 104B on the application servers $105_{1-N}$ may select an available tax professional based on any number of factors, such as an expertise of the tax professional matching a need or business requirement of the client, a favorability rating of the tax professional, an amount of time since the last video conference the tax professional participated in, and the like.

At block 420, a socket connection is established between the application servers $105_{1-N}$ connected to the instances of the tax application 104A,C executing on the client device 101 and the professional device 103 (e.g., the devices participating in the video conference). At block 430, a socket connection is established between a notification server $106_{1-N}$ and the application server $105_{1-N}$ to which the instance of the tax application 104C of the professional device 103 is connected. At block 440, a socket connection is established between a notification server $106_{1-N}$ and the application server $105_{1-N}$ to which the instance of the tax application 104A executing on the client device 101 is connected. At block 450, the application server $105_{1-N}$ to which the instance of the tax application 104A executing on the client device 101 is connected subscribes to push updates provided by the notification server $106_{1-N}$. In at least one embodiment, the instance of the tax application 104A executing on the client device 101 subscribes to receive push updates from the notification server $106_{1-N}$. At block 460, the video conference is established, and the parties may begin communicating via the video conference.

Figure 5:
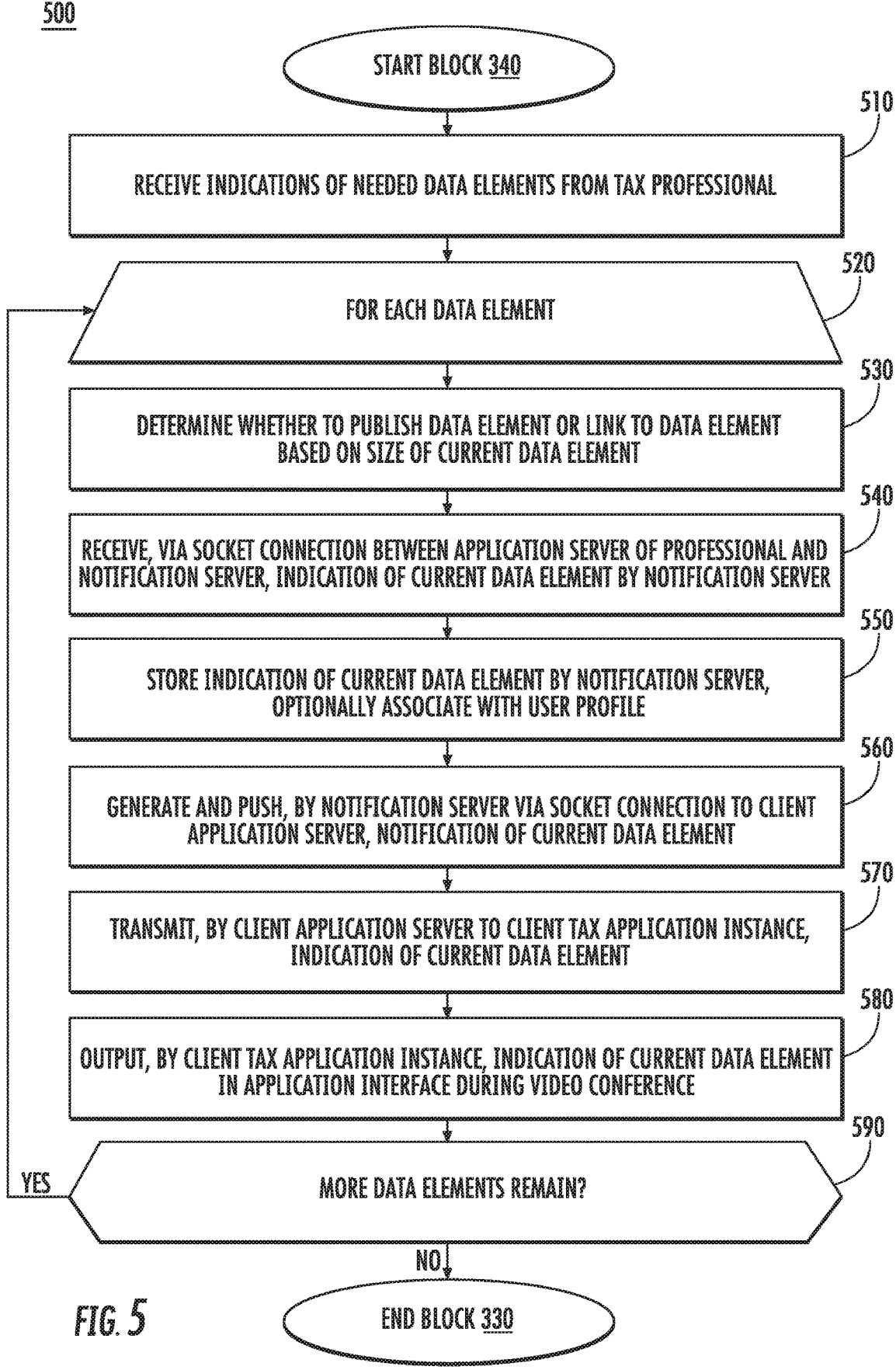
FIG. 5 is a flow chart illustrating a method to generate a list of real-time personalized documents, according to one embodiment.

FIG. 5 is a flow chart illustrating a method 500 corresponding to block 340 to generate a list of real-time personalized documents, according to one embodiment. As shown, the method 500 begins at block 510, where the instance of the tax application 104C executing on the professional device 103 receives indications of needed data elements from the tax professional. Generally, the tax professional enters the indications via the generation interface 111 during the video conference. At block 520, a loop including blocks 530-590 is executed for each received indication. At block 530, the instance of the tax application 104C executing on the professional device 103 determines whether to publish the current data element or a link to the data element, based on the size of the current data element. Generally, to reduce the size of the client data cache 114, data elements having a size that exceeds a threshold are not stored in the client data cache 114. Instead, larger data elements are stored at a storage location in the cloud (e.g., on a server $102_{1-N}$), and a uniform resource locator (URL) to the storage location is stored in the client data cache 114.

At block 530, the notification server $106_{1-N}$ receives an indication of the current data element via the socket connection between the notification server $106_{1-N}$ and the application server $105_{1-N}$ to which the instance of the tax application 104C of the professional device 103 is connected. At block 550, the notification server stores an indication of the current data element in the client data cache 114. Generally, the indication includes metadata describing the current data element, such as a type (e.g., tax form, personal metadata, income information, etc.), an associated party (e.g., the client, a spouse, a dependent, etc.), and the like. As previously indicated, if the size of the current data element does not exceed the threshold, the current data element is also stored in the client data cache 114. However, if the size of the current data element exceeds the threshold, the current data element is stored at a storage location in a server $102_{1-N}$ (e.g., in the client data 112), and a URL of the storage location is stored in the client data cache 114.

At block 540, the notification server 106$_{1-N}$ generates a push notification for the current data element, and pushes the notification to any subscribed application servers 105$_{1-N}$. At block 570, the subscribing application servers 105$_{1-N}$ transmit the received push notification to the instance of the tax application 104A executing on the client device 101. At block 580, the instance of the tax application 104A executing on the client device 101 outputs an indication of the current data element for display during the video conference. Doing so allows the client to view the information in real-time and during the video conference without having to switch screens or manually save the list of required data elements. At block 590, if more data elements remain, the method returns to block 590. Otherwise, the method 500 ends.

Figure 6:
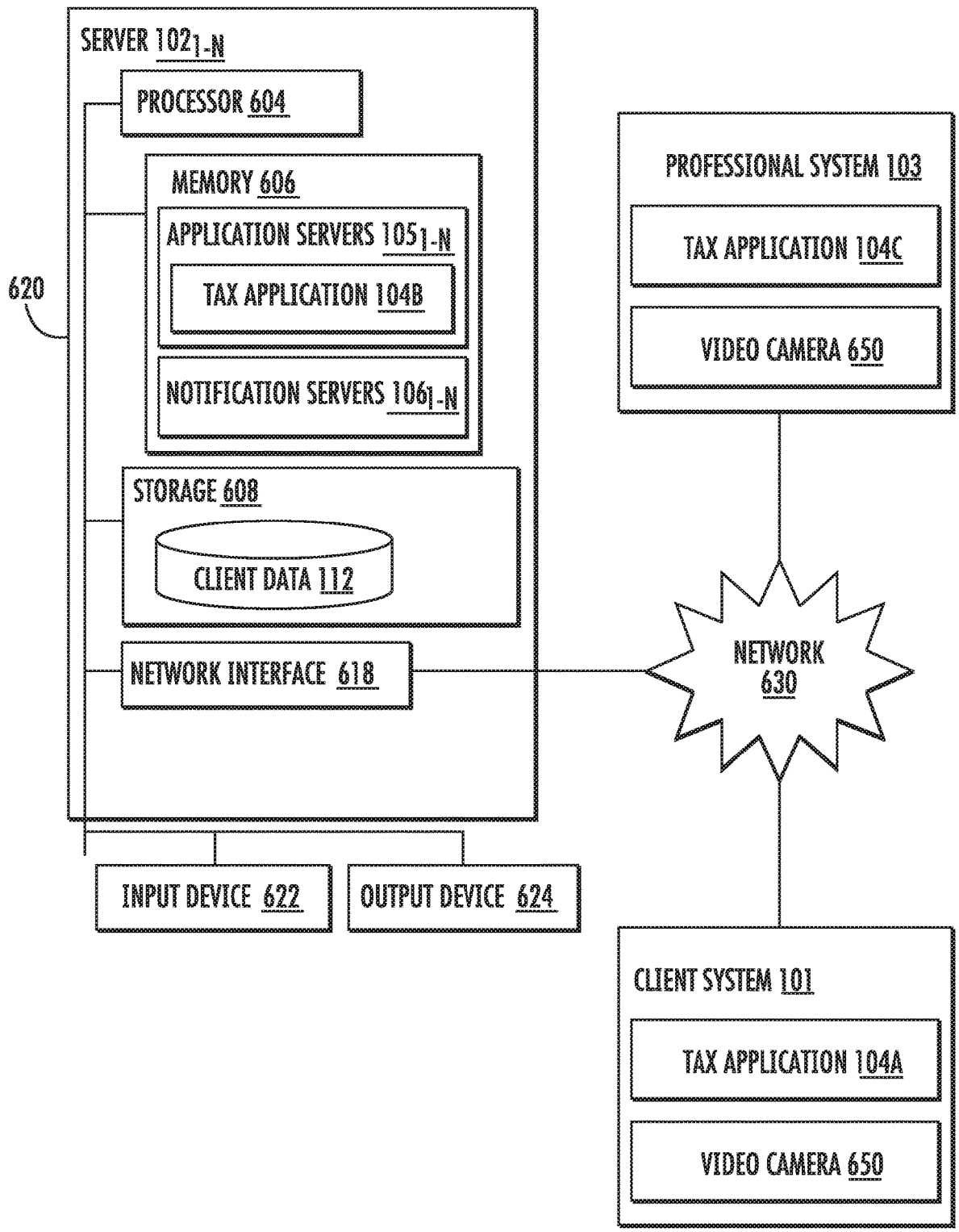
FIG. 6 is a block diagram illustrating a system configured to integrate real-time personalized documents into a video conference session, according to one embodiment.

FIG. 6 is a block diagram illustrating a system 600 configured to integrate real-time personalized documents into a video conference session, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include one or more network interface devices 618, input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the application servers 105$_{1-N}$ and the notification servers 106$_{1-N}$, each described in greater detail above. As shown, the storage 608 contains the client data 112, which stores user profile data. For example, the profile data stored in the client data 112 may include data elements identified by a tax professional as being necessary to prepare a tax return for the user. As described herein, the data elements may be identified during a video conference leveraging the video cameras 650 of the client system 101 and the professional system. Generally, the system 600 is configured to implement all systems, methods, and functionality described above with reference to FIGS. 1-5.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowcharts and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    establishing a video conference between a first application instance and a second application instance; and
    during the video conference:
        receiving, by an application server from the first application instance, an indication of a first data element required to prepare a tax return;
        providing, by the application server, the indication of the first data element to a notification server;
        storing, by the notification server, the indication of the first data element; and
        publishing, by the notification server, the indication of the first data element to the second application instance,
        wherein:
            the second application instance is configured to output the indication of the first data element for display via a graphical user interface of the second application instance after the video conference is completed, and
            the second application instance is further configured to display, via the graphical user interface, a user interface element associated with the indication of the first data element that allows the first data element to be input by a user.

2. The method of claim 1, further comprising:
    establishing a first socket connection between the first application instance and the application server, wherein the application server receives the indication of the first data element from the first application instance via the first socket connection; and
    establishing a second socket connection between the application server and the notification server, wherein the application server provides the received indication of the first data element to the notification server via the second socket connection.

3. The method of claim 2, wherein the application server comprises a plurality of virtual application servers, wherein the first and second socket connections are established with a first virtual application server of the plurality of virtual application servers, the method further comprising:
    establishing a third socket connection between the second application instance and a second virtual application server of the plurality of virtual application servers; and
    establishing a fourth socket connection between the second virtual application server and the notification server.

4. The method of claim 3, further comprising:
    subscribing the second application instance to receive push notifications from the notification server, wherein the notification server pushes the indication of the first data element to the second application instance via the second virtual application server and the third and fourth socket connections.

5. The method of claim 1, wherein storing the indication of the first data element by the notification server associates the first data element with a user profile associated with the second application instance.

6. The method of claim 1, wherein the first data element comprises a document, the method further comprising, prior to storing the indication:
    determining a type of the first data element; and
    upon determining that a size of the first data element exceeds a threshold:
        storing the first data element at a cloud storage location; and
        generating a uniform resource locator (URL) for the cloud storage location,
    wherein the indication stored by the notification server comprises the URL and the type of the first data element.

7. The method of claim 6, further comprising:
    receiving, by the application server from the first application instance, an indication of a second data element required to prepare the tax return;
    determining, by the notification server, that a size of the second data element does not exceed the threshold;
    determining a type of the second data element;
    storing, by the notification server, the second data element and an indication of the type of the second data element; and
    publishing, by the notification server, the indication of the second data element to the second application instance, wherein the second application instance is configured to output the indication of the second data element for display.

8. A system, comprising:
    a processor; and
    a memory containing a program which when executed by the processor performs an operation comprising:
        establishing a video conference between a first application instance and a second application instance; and
        during the video conference:
            receiving, by an application server from the first application instance, an indication of a first data element required to prepare a tax return;
            providing, by the application server, the indication of the first data element to a notification server;
            storing, by the notification server, the indication of the first data element; and publishing, by the notification server, the indication of the first data element to the second application instance, wherein:

the second application instance is configured to output the indication of the first data element for display via a graphical user interface of the second application instance after the video conference is completed, and the graphical user interface, a user interface element associated with the the graphical user interface, a user interface element associated with the indication of the first data, element that allows the first data element to be input by a user.

9. The system of claim 8, the operation further comprising:

establishing a first socket connection between the first application instance and the application server, wherein the application server receives the indication of the first data element from the first application instance via the first socket connection; and establishing a second socket connection between the application server and the notification server, wherein the application server provides the received indication of the first data element to the notification server via the second socket connection.

10. The system of claim 9, wherein the application server comprises a plurality of virtual application servers, wherein the first and second socket connections are established with a first virtual application server of the plurality of virtual application servers, the operation further comprising:

establishing a third socket connection between the second application instance and a second virtual application server of the plurality of virtual application servers; and establishing a fourth socket connection between the second virtual application server and the notification server.

11. The system of claim 10, the operation further comprising:

subscribing the second application instance to receive push notifications from the notification server, wherein the notification server pushes the indication of the first data element to the second application instance via the second virtual application server and the third and fourth socket connections.

12. The system of claim 8, wherein storing the indication of the first data element by the notification server associates the first data element with a user profile associated with the second application instance.

13. The system of claim 8, wherein the first data element comprises a document, the operation further comprising, prior to storing the indication:

determining a type of the first data element; and upon determining that a size of the first data element exceeds a threshold:

storing the first data element at cloud storage location; and generating a uniform resource locator (URL) for the cloud storage location, wherein the indication stored by the notification server comprises the URL and the type of the first data element.

14. The system of claim 13, the operation further comprising:

receiving, by the application server from the first application instance, an indication of a second data element required to prepare the tax return;

determining, by the notification server, that a size of the second data element does not exceed the threshold;

determining a type of the second data element;

storing, by the notification server, the second data element and an indication of the type of the second data element; and publishing, by the notification server, the indication of the second data element to the second application instance, wherein the second application instance is configured to output the indication of the second data element for display.

15. A non-transitory computer readable medium storing instructions, which, when executed by a processor, performs an operation comprising:

establishing a video conference between a first application instance and a second application instance; and during the video conference:

receiving, by an application server from the first application instance, an indication of a first data element required to prepare a tax return;

providing, by the application server, the indication of the first data element to a notification server;

storing, by the notification server, the indication of the first data element; and publishing, by the notification server, the indication of the first data element to the second application instance, wherein:

the second application instance is configured to output the indication of the first data element for display via a graphical user interface of the second application instance after the video conference is completed, and the second application instance is further configured to display, via the graphical user interface, a user interface element associated with the indication of the first data element that allows the first data element to be input by a user.

16. The non-transitory computer readable medium of claim 15, the operation further comprising:

establishing a first socket connection between the first application instance and the application server, wherein the application server receives the indication of the first data element from the first application instance via the first socket connection; and establishing a second socket connection between the application server and the notification server, wherein the application server provides the received indication of the first data element to the notification server via the second socket connection.

17. The non-transitory computer readable medium of claim 16, wherein the application server comprises a plurality of virtual application servers, wherein the first and second socket connections are established with a first virtual application server of the plurality of virtual application servers, the operation further comprising:

establishing a third socket connection between the second application instance and a second virtual application server of the plurality of virtual application servers; and establishing a fourth socket connection between the second virtual application server and the notification server.

18. The non-transitory computer readable medium of claim 17, the operation further comprising:
subscribing the second application instance to receive push notifications from the notification server, wherein the notification server pushes the indication of the first data element to the second application instance via the second virtual application server and the third and fourth socket connections.

19. The non-transitory computer readable medium of claim 15, wherein storing the indication of the first data element by the notification server associates the first data element with a user profile associated with the second application instance.

20. The non-transitory computer readable medium of claim 15, wherein the first data element comprises a document, the operation further comprising, prior to storing the indication:
   determining a type of the first data element; and
   upon determining that a size of the first data element exceeds a threshold:
      storing the first data element at cloud storage location; and
      generating a uniform resource locator (URL) for the cloud storage location,
   wherein the indication stored by the notification server comprises the URL and the type of the first data element.

* * * * *